Dec. 24, 1957  M. J. M. DE MILLEVILLE  2,817,358
HYDRAULIC GAS-PRESSURE REGULATOR
Filed July 30, 1953
3 Sheets-Sheet 1
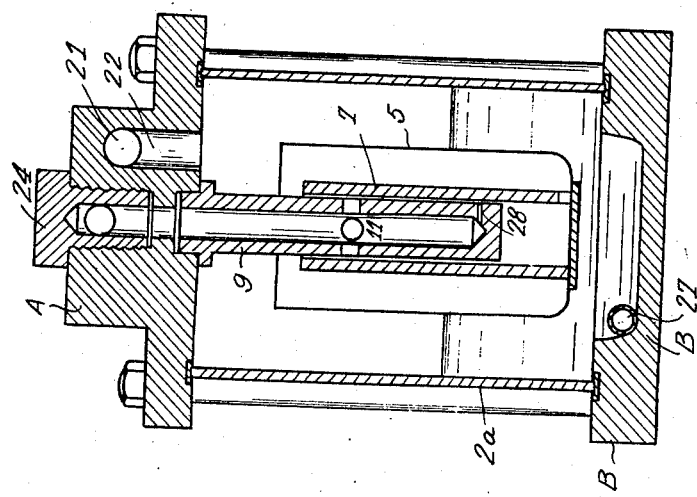
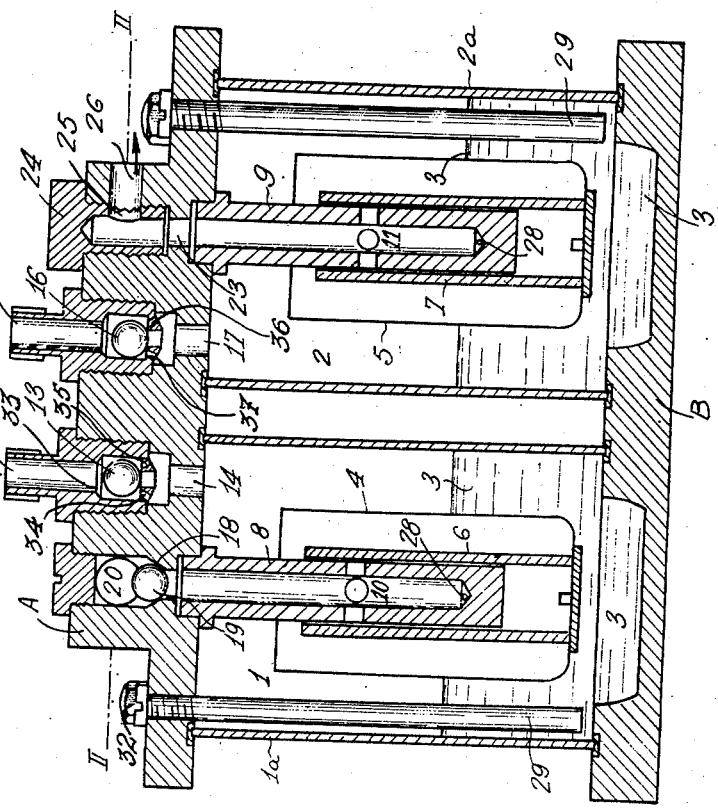

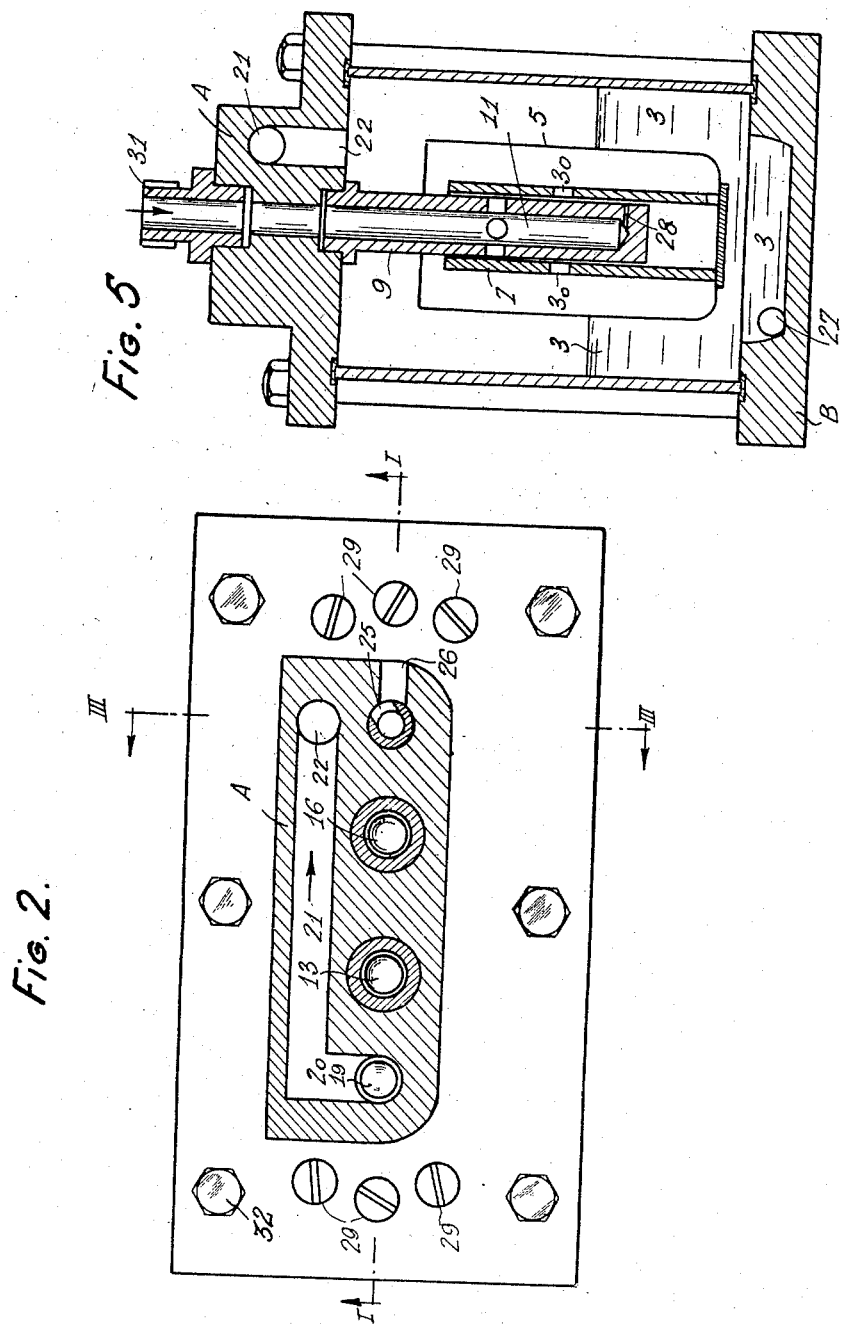

Dec. 24, 1957  M. J. M. DE MILLEVILLE  2,817,358
HYDRAULIC GAS-PRESSURE REGULATOR
Filed July 30, 1953  3 Sheets-Sheet 3
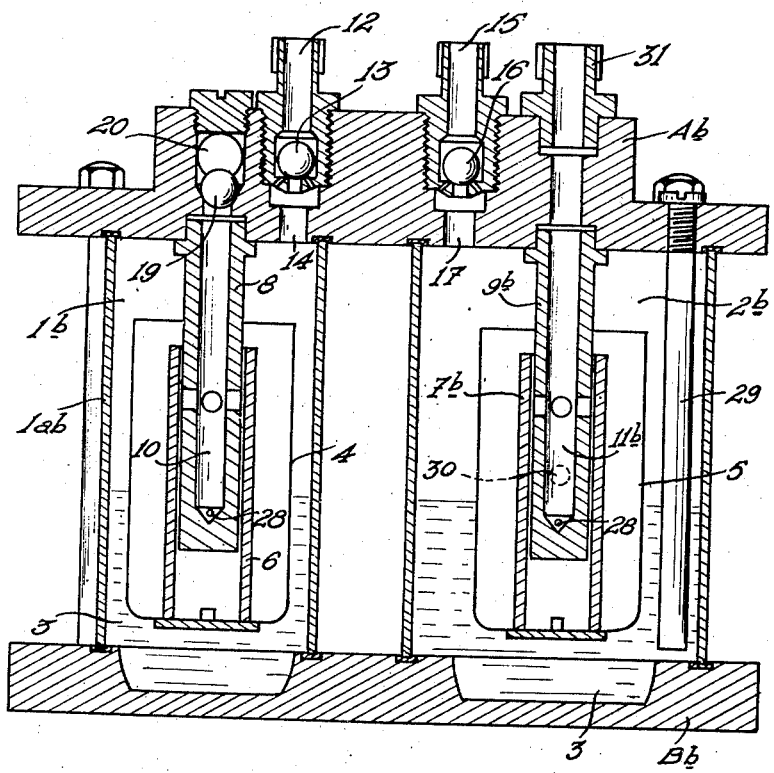
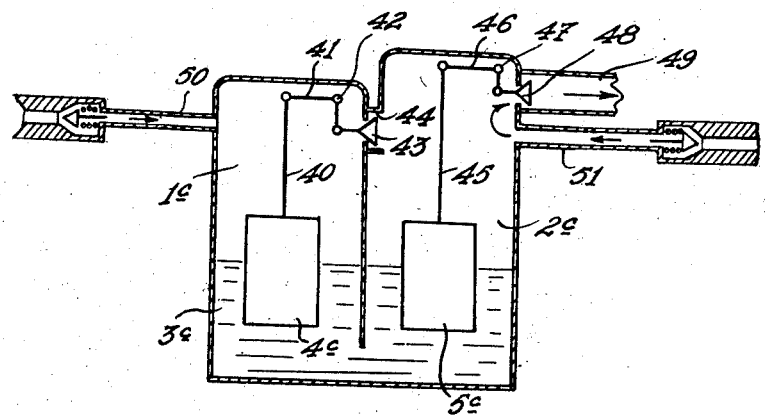

United States Patent Office 2,817,358
Patented Dec. 24, 1957

2,817,358
HYDRAULIC GAS-PRESSURE REGULATOR

Marie Joseph Maurice de Milleville, Paris, France

Application July 30, 1953, Serial No. 371,391

Claims priority, application France August 4, 1952

17 Claims. (Cl. 137—494)

This invention relates to a novel specific arrangement of a hydraulic gas-pressure regulator, adapted to operate either as an inlet regulator or pressure reducer, or as an exhaust gas regulator.

A regulator of the type broadly defined hereinabove comprises two fluid-tight enclosures or chambers hydraulically connected in the fashion of communicating vessels; one chamber receives a calibrated or reference pressure which regulates the pressure at which the other chamber is to be kept.

The very high sensitivity of apparatus of this type makes their adjustment very difficult and their operation scarcely reliable if a constant supervision is not devoted to them. Now it is the purpose of this invention to remedy this inconvenience by providing a plurality of correlated arrangements whereby the apparatus can be easily adjusted when mounted, and then set to operate automatically without any supervision.

The main object of the present invention is to provide a hydraulic apparatus for regulating the pressure of a gas with respect to a reference pressure. Said apparatus comprises two chambers interconnected through a permanent liquid seal, the first one receiving the gas under the reference pressure while the second one receives the gas the pressure of which is to be regulated and is provided with means adapted to permit said last gas to escape when its pressure is equal to a predetermined value with respect to said reference pressure, floats in said chambers, respectively, and responsive to the action exerted by the liquid of said liquid seal, means whereby the float in the first chamber controls through a valve device the admission of said calibrated or reference pressure from the first chamber to the other chamber, and means whereby the float in the other chamber controls the release of any pressure exceeding the calibrated or reference pressure.

A hydraulic pressure regulator of this type is so arranged that when it is connected with a given gas circuit, it will start and stop automatically, as soon as the circuit connected therewith is opened or closed; moreover, an apparatus of this type will remain unaffected by untimely disturbances likely to take place in the circuit.

The accompanying drawings forming part of this specification illustrate diagrammatically by way of example a few forms of embodiment of the invention, in order to afford a clearer understanding of the manner in which the same may be carried out in the practice. In the drawings:

Figure 1 is a longitudinal section, taken upon the line I—I of Figure 2, showing one form of embodiment of an apparatus constructed in accordance with the teachings of this invention.

Figure 2 is a part-sectional, plane view of the same apparatus, the section being taken upon the line II—II of Figure 1.

Figure 3 is another section taken upon the line III—III of Figure 2.

Figure 4 is a longitudinal section showing a modified form of embodiment of the apparatus shown in Figure 1, the apparatus operating in this case as a pressure reducer.

Figure 5 is a section similar to Figure 3 showing another view of the apparatus of Figure 4, and Figure 6 is a diagrammatical view showing a valve-controlled apparatus also made in accordance with the basic principles of the invention.

Referring first to Figure 1, the apparatus shown therein is a pressure equalizer arranged to release the excess of pressure of a gas contained in a chamber or enclosure, the pressure to be maintained being determined by comparison with a reference pressure of a gas contained in another chamber. Therefore, the apparatus comprises two interconnected chambers 1 and 2 consisting of cylinders 1a and 2a respectively, the upper and lower edges of these cylinders engaging sealing gaskets fitted in corresponding recesses formed in an upper flange A, and a lower flange B, respectively. These flanges A and B are clamped with each other through vertical bolts 32. The chambers 1 and 2 contain a liquid 3 up to a predetermined level and a pair of open-top or cup-shaped cylindrical floats 4, 5. The up- and downward movements of these floats control valve means consisting of sleeve members 6, 7 fastened to the bottom of the floats and slidably engaging in fluid-tight relationship corresponding hollow guides 8, 9 fast with the upper flange A and having radial ports 10 and 11 formed therein at a proper axial position.

The up- or downward movements of the liquid 3, resulting from the difference in the pressure exerted in chambers 1 and 2 will cause the relevant floats 4 and 5 to follow the movement of the liquid level, so that the radial ports 10 and 11, leading into the axial bore of these guides, are either exposed or kept in their normal occluded condition, thereby permitting the transmission of the pressure existing within the enclosures 1 and 2 to the interior of these guides. The ports 10 and 11 open when the floats descend until the upper edges of both sleeve members 6 and 7 become flush with these ports.

The chamber 1 is formed at its upper portion with a channel 14 extending through the flange A and receiving at its outlet end a pipe fitting 12 through which this chamber may be connected by means of an adequate pipe (not shown) with the enclosure or circuit in which the calibrated or reference pressure is maintained.

This pipe fitting comprises a safety one-way ball valve 13 the seat 33 of which overlies the ball. Thus, in the direction toward the chamber 1, the flow of fluid at the calibrated or reference pressure is not interfered with. In the reverse direction, if this fluid, due to a sudden pressure drop in the channel 12, suddenly tended to escape from this chamber 1, the pressure would be directed through passages 34 concentrical with the grid 35 retaining the ball 13 toward the lower portion of this ball, so as to lift and urge it against its seat, and therefore prevent any leak.

Overlying the other chamber 2, the flange A has formed therein a channel 17 also provided with a pipe fitting 15 comprising a safety one-way ball valve 16 similar to the ball valve 13 of the aforesaid fitting 12.

The axial bore in guide member 8 communicates at its upper end with a ball valve 19 seated by gravity on its seat 18. The chamber of this valve is connected with a channel 20 formed with an extension 21 provided in turn with another extension in the form of a port 22 leading into the upper portion of the other chamber 2. The assembly consisting of the one-way valve 19, channels 20, 21 and port 22 constitutes an automatic and safety device having the dual purpose of enabling the apparatus to operate automatically and to prevent the liquid, even if of low density, from flowing untimely into a single chamber.

On the other hand, the axial bore of guide member 9 communicates with a chamber 23 formed in the upper flange A. This chamber 23 leads into a cavity formed in a plug 24 adapted to pivot in, and in fluid-tight engagement with, the flange A. This plug is formed with a knurled head and a radial port 25, the latter registering with a passage 26 bored in flange A and leading to the outside. By changing the angular position in which the plug 24 is set, the cross-sectional area of the exhaust port can be adjusted at will. As the pressure admitted in chamber 2 through the fitting 15 increases, the liquid 3 therein is forced out and as a result the float 5 is lowered until its sleeve member 7 exposes the ports 11 of the fixed guide 9, so that any excess pressure may be released through the exhaust port 26.

The connection whereby the two chambers 1 and 2 constitute communicating vessels consists of a channel 27 provided tangentially to a pair of circular cavities formed in the bottom of each chamber in the lower flange B. With this arrangement a rotary motion is imparted to the liquid in the receiving chamber, and the relevant float is somewhat responsive to this rotary motion. As a result, the valve device consisting of the sleeve and guide members is rotated to a certain extent, thereby facilitating the relative motion of the parts involved and preventing any local wear. On the other hand, the contacting surfaces of the sleeve and guide members are kept lubricated through a capillary orifice 28 through which the bottom of each guide member communicates with its outer surface. A reserve of fine lubricating oil is contained in the recessed holes of the guide members and seeps into the clearance between the guide and sleeve members.

A plurality of rods 29 screwed in, and in fluid-tight engagement with the upper flange A, extend into the chambers 1 and 2 to the bottom thereof. By removing one or more of these rods from the chamber concerned the area available for the inner pressure may be increased; thus, the respective areas of both chambers may be adjusted differentially with the greatest accuracy. Besides, this adjustment may be made still more accurate by introducing rods of different cross-sectional dimensions. According to the size of the apparatus, segments having a predetermined volume may be substituted for the aforesaid rods, in order to obtain more substantial variations in volume. This arrangement is advantageous in that it is not liable to get out of order and to affect the sensitivity of the appaartus.

Preferably, the liquid 3 will have a very high density.

The apparatus described hereinabove operates as follows:

The apparatus is connected with a gas circuit of which the pressure should not exceed a predetermined value with respect to a calibrated or reference pressure prevailing in the chamber 1 through the pipe connection 12; besides, the fluid circuit of which the pressure is to be controlled is connected with the other chamber 2 through the pipe fitting 15; if the general circuit arrangement is such that the two fluids under pressure are fed simultaneously to both chambers of the regulator, the apparatus is ready to operate immediately.

When the pressure to be controlled, which prevails in chamber 2, reaches a value higher than the adjusted pressure, the liquid 3 is forced toward the other chamber 1 and causes the sleeve member 5 to move downwards so as to expose the ports 11. The pressure fluid in excess escapes through the outlet 26. The exhaust is intermittent or continuous, according to the position in which the plug 24 is set.

If the control circuits are so disposed that the calibrated or reference pressure is admitted firstly through the fitting 12 into the chamber 1, it causes the aforesaid automatic and safety device consisting of the one-way valve 19, channels 20, 21 and 22 to operate, and under these conditions, the apparatus is automatically ready to receive the pressure to be controlled. When this pressure is admitted into chamber 2, the operation is resumed in the manner set forth hereinabove.

If, on the contrary, due to a possible faulty handling, the pressure to be controlled were transmitted into the regulator without admitting the calibrated or reference pressure into the other chamber 1, chamber 2 will operate alone, and will be exhausted freely through the outlet 26 until the calibrated or reference pressure is admitted into the other chamber 1. In this last case, the apparatus will operate normally, but until then it was duly protected against any untimely introduction of liquid into a single chamber, as this liquid has advantageously a high density.

In case a sudden pressure drop occurred, for example on account of the breaking of one of the pipe fittings 12 or 15, one of the balls 13 or 16 will seal the corresponding channel, thereby insulating the regulator from the faulty circuit portion until the latter has been repaired. At this time, the ball 13 or 16 will receive the same pressure from below and above, and will fall by gravity on its retaining grid 35 or 36 to restore the normal operating conditions of the apparatus.

The apparatus described hereinabove constitutes an exhaust or over-pressure regulator. Figures 4 and 5 show a regulator of substantially similar design but adapted to operate as a pressure reducer. This apparatus differs from the regulator illustrated in Figures 1 to 3 in that its chamber 1b corresponding to chamber 1 of the previous embodiment, does not include the volume-adjusting rods 29, and also in that the diameter of the left-hand cylinder 1ab (Fig. 4) is smaller than that of the cylinder 1a.

Besides, the chamber 2b (corresponding to chamber 2 of the previous embodiment) is also modified to a certain extent.

Thus, as will be seen in Figures 4 and 5, a pipe fitting 31 is substituted for the plug 24. The sleeve member 7b is formed with a circular set of radial orifices 30 adapted in a given position to communicate or register with the radial holes 11 of the guide member 9; the latter communicates through its axial bore with the aforesaid fitting 31. This fitting 31 is connected with the gas circuit of which the pressure is to be reduced, and the other pipe fitting 15 is fed with the reduced-pressure fluid. The channels 37 and the retaining grid 36 of the ball valve 16 are dimensioned to allow the desired fluid to flow therethrough at the reduced pressure, the valve ball 16 acting to close its relevant passage only in case of a sudden and strong rise in the fluid flow, attributable only to an abnormal pressure drop downstream of this ball 16.

The operation of chamber 2b acting as a pressure reducer is reversed in relation to the operation of chamber 2 of the exhaust regulator illustrated in Figs. 1 to 3. The pressure to be reduced is fed through the pipe fitting 31 and cannot penetrate into this chamber 2b unless the latter contains gas under a decreasing pressure, such as to allow the liquid level 3 to rise in chamber 1b, due to the action exerted by the fluid at the calibrated or reference pressure. The float 5 and sleeve member 7b will move upwards until the orifices 30 register with the ports 11. The pressure to be reduced is admitted into chamber 2b and as the pressure increases therein the liquid 3 is again forced back to chamber 1b. The float 5 and its attached sleeve member 7b move downwards and the orifices 30 do not register any more with the ports 11, thus interrupting the admission of high-pressure fluid, whereby the latter will assume in chamber 2b but the desired value of balance, with respect to the calibrated or reference pressure prevailing in chamber 1b.

In the pressure reducer as well as in the exhaust regulator the respective values of the pressures prevalent in chambers 1 and 2 or 1b and 2b are determined in each specific case by the value available in each of the two enclosures for the areas on which the pressures are caused to act; the ratio between these areas may be 1:1 or any other suitable ratio may be resorted to, in case the surfaces are purposely different by construction or through the use, during the adjustment operation, of rods 29 or movable segments as suggested hereabove, according to cases.

Figure 6 shows diagrammatically another form of embodiment of the exhaust or overpressure regulator according to the invention, wherein mechanically operated valves of the mushroom or like type are incorporated. This apparatus comprises two communicating chambers 1c and 2c containing a liquid 3c up to a certain level and having located therein two floats 4c and 5c. The up- and downward movements of these floats are adapted to control obturator means consisting of valve cones 43 and 48. For this purpose, the float 4c is connected through a rod 40 to one end of a bell-crank lever 41 fulcrumed at 42, and the other end of this lever is pivotally attached to the stem of a valve cone 43 adapted to close a port 44 formed through a common partition separating the chambers 1c and 2c. Similarly, the other float 5c is connected through a rod 45 to one end of a bell-crank lever 46 fulcrumed at 47, the other end of this lever being pivotally attached to the valve of a valve cone 48 obturating an exhaust port 49. An inlet duct 50 connects this chamber 1c with an enclosure in which the calibrated or reference pressure is maintained; besides, another duct 51 connects the chamber 2c with the device or circuit generating the pressure to be adjusted. Said inlet ducts 50 and 51 are associated with one-way valves similar to the one-way valves 13 and 16 of Figs. 1 and 4 for closing chambers 1c and 2c if a pressure drop occurs upstream of said inlet ducts.

This apparatus operates as follows:

After connecting the apparatus with a circuit in which the gas pressure must not exceed a predetermined value in relation to the calibrated or reference pressure prevailing in chamber 1c and fed thereto through the duct 50, when the pressure to be controlled in chamber 2c exceeds the adjustment value, the liquid 3c is forced toward the chamber 1c and the resulting downward movement of the relevant float 5c is transmitted through the lever 46 to the valve cone 48 thereby allowing any excess pressure to be released through the exhaust port 49.

When the calibrated or reference pressure is introduced first into the chamber 1c through the duct 50, it operates the automatic device constituted by the valve cone 43 and equalizes the pressures in both enclosures 1c and 2c. As a result, the apparatus is automatically conditioned to receive the pressure to be adjusted or controlled.

The apparatus illustrated in Fig. 6 may also be equipped with means for varying the cross-sectional areas in chambers 1c and 2c, for example in the form of rods similar to those illustrated in Figures 1 to 3.

Of course, many modifications and alterations may be brought to the apparatus shown and described herein by way of example, without departing from the spirit and scope of the invention, as set forth in the appended claims.

What I claim is:

1. A hydraulic apparatus for regulating the pressure of a gas, which comprises a first enclosure having an inlet orifice for admitting a gas under a reference pressure into said first enclosure, means for closing said inlet orifice in case a pressure drop occurs upstream thereof, another enclosure having two orifices, one for admitting the gas of which the pressure is to be regulated, and the other for exhausting said gas, a common liquid partially filling both enclosures, a hydraulic duct interconnecting said two enclosures so as to form a permanent liquid seal therebetween, a channel interconnecting the two gaseous atmospheres of said two enclosures, means for closing said channel as soon as the pressure in the other enclosure is equal to the reference pressure, a float located in each of said enclosures and responsive to the action of the liquid in said permanent liquid seal, means controlled by the float in said first enclosure for actuating said closing means, means controlled by the float in said other enclosure for obturating one of said two orifices thereof, means for closing said channel when the gas under the pressure to be adjusted tends to flow therethrough from said other enclosure to said first enclosure, and means for closing the second orifice of said other enclosure in case the gas the pressure of which is to be regulated tends to escape through said second orifice from said other enclosure.

2. A hydraulic apparatus for regulating the pressure of a gas, which comprises a first enclosure fed with a gas under a reference pressure and having an inlet orifice, another enclosure receiving a gas of which the pressure is to be regulated and having an inlet orifice and an exhaust orifice, means for closing said inlet orifices in case a pressure drop occurs upstream of said orifices, respectively, a common liquid partially filling said enclosures, a hydraulic duct connecting said enclosures with each other so as to form a permanent liquid seal therebetween, a channel connecting the two gaseous atmospheres of said two enclosures, means for closing said channel as soon as the pressure to be regulated is equal to the reference pressure, a float located in each of said enclosures and responsive to the action of the liquid of said permanent liquid seal, means controlled by the float in said first enclosure for actuating said closing means, means for closing said channel when the gas under the pressure to be adjusted tends to flow therethrough from said other enclosure to said first enclosure, and means controlled by the float in said other enclosure for opening the exhaust orifice thereof when the pressure prevailing therein exceeds a predetermined ratio with respect to said reference pressure.

3. A hydraulic apparatus for regulating the pressure of a gas, comprising a first enclosure having an inlet orifice for admitting a gas under a reference pressure, a one-way valve adapted to close said inlet orifice when said gas under said reference pressure tends to escape through said inlet orifice from said enclosure, another enclosure having two orifices, one for admitting gas of which the pressure is to be regulated and the other for exhausting this gas, a common liquid partially filling said enclosures, a hydraulic duct interconnecting said enclosures so as to form a permanent liquid seal therebetween, a channel interconnecting the gaseous atmospheres of said enclosures, a second one-way valve located in said channel and adapted to close the same when the gas under the pressure to be adjusted tends to flow from said other enclosure to said first enclosure, a float located in each of said enclosures and responsive to the action of the liquid of said permanent liquid seal, means controlled by the float in said first enclosure for obturating said channel therein, means controlled by the float in said other enclosure for closing one of the two orifices of said other enclosure as long as the pressure prevailing therein is not equal to a predetermined ratio of the reference pressure, and a third one-way valve adapted to close the second orifice of said other enclosure when the gas under the pressure to be adjusted tends to escape from said other enclosure through said second orifice.

4. A hydraulic apparatus for regulating the pressure of a gas, according to claim 3, wherein each first and third one-way valve comprises a valve seat, a ball adapted to obturate said valve seat, and a grid retaining said ball by gravity, said grid being formed with blow holes adapted to enable said ball to be seated when the gas contained in the relevant enclosure tends to escape untimely through said valve seat.

5. A hydraulic apparatus for regulating the pressure of a gas, comprising a first enclosure having an inlet orifice for admitting a gas under a reference pressure therein, means for closing said inlet orifice in case a pressure drop occurs upstream thereof, another enclosure having two orifices, one for admitting the gas of which the pressure is to be adjusted and the other for exhausting said gas, a common liquid partially filling said two enclosures, a hydraulic duct interconnecting said enclosures so as to form a permanent liquid seal therebetween, a channel interconnecting the two gaseous atmospheres of said enclosures, means for closing said channel as soon as the pressure in the other enclosure is equal to the reference pressure, a float located in each of said enclosures and responsive to the action of the liquid of said permanent liquid seal, means controlled by said float in said first enclosure for actuating said closing means therein, another means controlled by the float in said other enclosure for obturating one of said two orifices in said other enclosure, means for closing the other orifice of said other enclosure in case the gas the pressure of which is to be regulated tends to escape through said other orifice from said other enclosure, means for closing said channel when the gas under the pressure to be adjusted tends to flow therethrough from said other enclosure to said first enclosure, and adjustment means in at least one of said enclosures for varying the surface of the liquid on which the pressure is caused to act.

6. A hydraulic apparatus for regulating the pressure of a gas, according to claim 5, wherein said adjustment means comprises at least one solid body extending into said liquid in the relevant enclosure.

7. A hydraulic apparatus for regulating the pressure of a gas, according to claim 5, wherein said adjustment means comprises a plurality of solid bodies of different cross-sections intended to be introduced independently of one another in at least one of said enclosures.

8. A hydraulic apparatus for regulating the over-pressure of a gas, comprising a first enclosure having an inlet orifice for admitting a gas under a reference pressure, another enclosure having two orifices, one for admitting the gas of which the pressure is to be adjusted and the other for exhausting said gas, means for colsing the orifices for admitting the gases in case a pressure drop occurs upstream of said orifices, respectively, a common liquid partially filling said enclosures, a hydraulic duct interconnecting said enclosures so as to form a permanent liquid seal therebetween, a channel connecting the gaseous atmospheres of said enclosures with each other, means for closing said channel as soon as the pressure in said other enclosure is equal to the reference pressure, a float located in each of said enclosures and responsive to the action of the liquid of said permanent liquid seal, means controlled by said float in said first enclosure for actuating said closing means therein, means for closing said channel when the gas under the pressure to be adjusted tends to flow therethrough from said other enclosure to said first enclosure, and means controlled by the float in the other enclosure for obturating the gas exhaust orifice in said other enclosure.

9. A hydraulic apparatus for regulating the over-pressure of a gas, comprising a first enclosure having an inlet orifice for admitting a gas under a reference pressure, a one-way valve adapted to close said inlet orifice when said gas under said reference pressure tends to escape through said inlet orifice, another enclosure having two orifices, one for admitting gas of which the pressure is to be regulated and the other for exhausting said gas, a second one-way valve adapted to close the inlet orifice of said other enclosure when the gas under the pressure to be regulated tends to escape from said other enclosure through the inlet orifice thereof, a common liquid partially filling said enclosures, a hydraulic duct connecting said enclosures so as to form a permanent liquid seal therebetween, a channel interconnecting the gaseous atmospheres of said enclosures, a third one-way valve located in said channel and adapted to close the same when the gas under the pressure to be regulated tends to flow from said other enclosure to said first enclosure, a float located in each of said enclosures and responsive to the action of the liquid of said permanent liquid seal, means controlled by the float in said first enclosure for obturating said channel therein, and means controlled by the float in said other enclosure for obturating the gas exhaust orifice therein.

10. A hydraulic apparatus for regulating the over-pressure of a gas, comprising a first enclosure having an inlet orifice for admitting a gas under a reference pressure, a one-way valve adapted to close said inlet orifice when said gas under said reference pressure tends to escape from said first enclosure through said inlet orifice, another enclosure having two orifices, one for introducing the gas of which the pressure is to be regulated and another for exhausting said gas, a second one-way valve adapted to close the inlet orifice of said other enclosure when said gas under the pressure to be regulated tends to escape through the inlet orifice of said other enclosure, a common liquid partially filling said enclosures, a hydraulic duct interconnecting said enclosures so as to form a permanent liquid seal, a channel interconnecting the gaseous atmospheres of said enclosures, a third one-way valve located in said channel and adapted to close the same when the gas under the pressure to be adjusted tends to flow from said other enclosure to said first enclosure, a float located in each of said enclosures and responsive to the action of the liquid of said permanent liquid seal, a blind-bored hollow guide member rigid with and positioned in each of said enclosures, the axial bores of said guide members being connected respectively to said channel in said first enclosure and to said exhaust orifice in said other enclosure, a sleeve member fast with each float, said sleeve members having an inner diameter substantially equal to the outer diameter of said guide members so as to slidably engage the latter, said blind-bored hollow guide members being formed with radial perforations in such longitudinal position that when said floats are moved downwards in said enclosures said perforations will be exposed by said sleeve members.

11. A hydraulic apparatus for regulating the over-pressure of a gas, according to claim 10, wherein the bottoms of the enclosures are respectively formed with circular cavities and wherein the hydraulic duct is tangential to said cavities, whereby the displacement of said liquid from one enclosure to the other imparts a whirling motion to said liquid in the enclosure receiving the same.

12. A hydraulic apparatus for regulating the over-pressure of a gas, according to claim 10, wherein said enclosures are cylindrical and said hydraulic interconnecting duct is disposed tangentially thereto, whereby the displacement of said liquid from one enclosure to the other imparts a whirling motion to said liquid in the enclosure receiving the same.

13. A hydraulic apparatus for regulating the over-pressure of a gas, according to claim 10, wherein each of said stationary guide members is formed with a capillary radial duct extending through its wall in the vicinity of the bottom of its blind bore, a reserve of fluid lubricating material being placed in said blind bores of said guide members.

14. A hydraulic apparatus for regulating the over-pressure of a gas, comprising a first enclosure having an inlet orifice for admitting a gas under a reference pressure, another enclosure having two orifices, one for introducing the gas of which the pressure is to be regulated and the other for exhausting said gas, means for closing the orifices for admitting the gases in case a pressure drop occurs upstream of said orifices, respectively, a common liquid partially filling said enclosures, a hydraulic duct interconnecting said enclosures so as to form a permanent liquid seal therebetween, a channel interconnecting the gaseous atmospheres of said enclosures, means for closing said channel as soon as the pressure in said other enclosure is equal to the reference pressure, a float disposed in each of said enclosures and responsive to the action of the liquid of said permanent liquid seal, means controlled by said float in said first enclosure for actuating said closing means, means controlled by the float in said other enclosure for obturating said exhaust orifice therein, means for closing said channel when the gas under the pressure to be adjusted tends to flow therethrough from said other enclosure to said first enclosure, and another means for adjusting the cross-sectional area of said exhaust orifice.

15. A hydraulic apparatus for regulating the over-pressure of a gas, comprising a first enclosure having an inlet orifice for admitting a gas under a reference pressure, another enclosure having two orifices, one for introducing the gas of which the pressure is to be regulated and the other for exhausting said gas, means for closing the orifices for admitting the gases in case a pressure drop occurs upstream of said orifices, respectively, a common liquid partially filling said enclosures, a hydraulic duct interconnecting said enclosures so as to form a permanent liquid seal therebetween, a channel interconnecting the gaseous atmospheres of said enclosures, a float located in each of said enclosures and responsive to the action exerted by the liquid of said permanent liquid seal, a mechanically operated valve mounted in said channel and adapted to close the same, a control linkage connecting said valve with said float in said first enclosure in order to close said channel as soon as the pressure in said other enclosure is equal to a predetermined ratio of the reference pressure, another mechanically operated valve adapted to close the exhaust orifice of said other enclosure, and a control linkage connecting said other valve with the relevant float in said other enclosure in order to close said exhaust orifice as long as the pressure in said other enclosure is at the most equal to said predetermined ratio of said reference pressure.

16. A hydraulic regulator for reducing the pressure of a gas, comprising a first enclosure having an inlet orifice for admitting a gas under a reference pressure, another enclosure having two orifices, one for admitting a gas of which the pressure is to be reduced and another for exhausting said gas at a reduced, calibrated pressure, means for closing said inlet orifice and said exhausting orifice in case a pressure drop occurs upstream of said inlet orifice and downstream of said exhausting orifice, respectively, a common liquid partially filling said enclosures, a hydraulic duct interconnecting said enclosures so as to form a permanent liquid seal therebetween, a channel interconnecting the gaseous atmospheres of said enclosures, means for closing said channel as soon as the pressure in said other enclosure is equal to the reference pressure, a float located in each of said enclosures and responsive to the action of the liquid of said permanent liquid seal, means controlled by said float in said first enclosure for actuating said closing means, means for closing said channel when the gas under the pressure to be adjusted tends to flow therethrough from said other enclosure to said first enclosure, and means controlled by the float in said other enclosure for obturating said gas inlet orifice therein.

17. A hydraulic regulator for reducing the pressure of a gas, comprising a first enclosure having an inlet orifice for admitting a gas under a reference pressure, a one-way valve adapted to close said inlet orifice when said gas under the reference pressure tends to escape from said enclosure through said inlet orifice, another enclosure having two orifices, one for admitting the gas of which the pressure is to be reduced, and the other for enabling said gas to be exhausted at the desired reduced pressure, a common liquid partially filling said enclosures, a hydraulic duct interconnecting said enclosures so as to form a permanent liquid seal therebetween, a channel interconnecting the gaseous atmospheres of said enclosures, a second one-way valve mounted in said channel and adapted to close the same when said gas under the pressure to be reduced tends to escape from said other enclosure to said first enclosure, a third one-way valve adapted to close the exhaust orifice of said other enclosure when said gas of which the pressure is to be reduced tends to escape through said exhaust orifice when the exhaust draught exceeds a predetermined value, a float located in each of said enclosures and responsive to the action of the liquid of said permanent liquid seal, a pair of blind-bored hollow guide members each fast with one of said enclosures, the axial bores of said guide members being connected respectively to said channel in said first enclosure and to said inlet orifice in said other enclosure, a pair of sleeve members fast with said floats, said sleeve members having an inner diameter substantially equal to the outer diameter of said blind-bored hollow guide members so as to slidably engage them, said blind-bored hollow guide members being formed with radial perforations so arranged that they are exposed by said sleeve members when said floats are moved downwards in said enclosures, the sleeve member located in said other enclosure being further provided with intermediate radial perforations so arranged that they register with the radial perforations of the corresponding blind-bored hollow guide member when the float of said other enclosure is moved upward to a predetermined level.

References Cited in the file of this patent

UNITED STATES PATENTS 392,602     Frank               Nov. 13, 1888